US005898824A

United States Patent [19]

Kato et al.

[11] Patent Number: 5,898,824

[45] Date of Patent: Apr. 27, 1999

[54] FACSIMILE MACHINE FOR USE IN COMBINATION WITH PC

[75] Inventors: Tokunori Kato, Ichinomiya; Kiyotsugu Takiguchi, Nagoya; Makoto Yamada, Gifu, all of Japan

[73] Assignee: Brother Kogyo Kabushiki Kaisha, Nagoya, Japan

[21] Appl. No.: 08/744,151

[22] Filed: Nov. 12, 1996

[30] Foreign Application Priority Data

| | | | |
|---|---|---|---|
| Nov. 10, 1995 | [JP] | Japan | 7-292783 |
| Nov. 13, 1995 | [JP] | Japan | 7-294356 |

[51] Int. Cl.[6] .......... H04N 1/32

[52] U.S. Cl. .......... 395/115; 358/404; 358/444; 358/468

[58] Field of Search .......... 358/404, 434, 358/442, 468, 444; 395/114–116, 200.02, 200.03, 200.08, 200.2; H04N 1/00, 1/32

[56] References Cited

U.S. PATENT DOCUMENTS

| | | | |
|---|---|---|---|
| H1677 | 9/1997 | Hu et al. | 358/468 |
| 5,177,620 | 1/1993 | Fukushima | 358/404 |
| 5,483,353 | 1/1996 | Kudou | 358/404 |
| 5,598,533 | 1/1997 | Yokota et al. | 395/114 |
| 5,621,540 | 4/1997 | Terajima | 358/404 |
| 5,659,669 | 8/1997 | Narukawa et al. | 395/115 |
| 5,675,422 | 10/1997 | Hara et al. | 358/404 |
| 5,798,848 | 8/1998 | Ouchi | 358/468 |

FOREIGN PATENT DOCUMENTS

| | | |
|---|---|---|
| B-2-63-13391 | 3/1988 | Japan . |
| A-1-286671 | 11/1989 | Japan . |
| A-6-98077 | 4/1994 | Japan . |

*Primary Examiner*—Kim Yen Vu
*Attorney, Agent, or Firm*—Oliff & Berridge, PLC

[57] ABSTRACT

In a facsimile machine for used in combination with a personal computer, when incoming image data from a remote facsimile machine cannot be printed simultaneously with receipt of the data and a RAM of the facsimile machine does not have a sufficient storage capacity to store the data, the personal computer plays a role of a data receiving end for the incoming image data. When the RAM of the facsimile machine has a space to store the incoming image data, it is stored therein provided that simultaneous printing of the image data is impossible. When the storage capacity of the RAM is reduced to less than a predetermined minimum in the process of storing operation and the entire image data cannot be stored in the RAM, then the remaining part of the image data is sent to the personal computer and stored in its associated hard disk.

25 Claims, 7 Drawing Sheets

FACSIMILE MACHINE FOR USE IN COMBINATION WITH PC

BACKGROUND OF THE INVENTION

1. Field of the Invention

The present invention relates to a facsimile system having a facsimile machine connected to an external data processing device, such as a personal computer.

2. Description of the Related Art

Conventional facsimile machines have an auto-answer capability. As described in Japanese Laid-Open Patent Publication (Kokai) No. HEI-1-286671, when the facsimile machine receives an incoming voice message (voice data) and/or image data from a remote facsimile machine or other data communicating device in the auto-answer mode, the received image data is stored in a data storage device in the form of a digital signal. Then, the image data is printed on a recording paper and the voice message is reproduced from a speaker.

The conventional facsimile machines also have a memory transmission capability and a scheduled/delayed transmission capability. The memory transmission is performed by storing image data in a memory prior to transmission and then transmitting the image data stored therein to the remote facsimile machine. The scheduled/delayed transmission is for scheduling a time of facsimile transmissions. If an operator scans a document into a memory-equipped machine and programs it to dial up and transmit the document at a specific time or after a certain period of time has passed, the operator can enjoy the ultimate in unattended facsimile operation. When the scheduled/delayed transmission is to be performed, the memory is typically occupied and thus not available for the transmission of another data.

Recently proposed facsimile machines have a multi-copying capability capable of generating plural sets of copies of the original documents. Some facsimile machines have a sort copy mode capable of sorting the copies of the original documents to agree with the pages of the original documents. When such features are used, the memory of such a facsimile machine is urged to store a large amount of data on the original documents. However, the memory of the facsimile machine does not have a large storage capacity and thus is liable to become full when the document data is stored therein. Consequently, when one of the above features or functions of the facsimile machine is used, the remaining features of the facsimile machine cannot be used.

Japanese Patent Publication (Kokoku) No. SHO-63-13391 and Japanese Laid-Open Patent Publication (Kokai) No. HEI-6-98077 describe providing an interface (I/O port) to the facsimile machine allowing to connect the facsimile machine to a personal computer (PC). Such a facsimile/PC combination is convenient because the facsimile machine can be used as a terminal of the PC. The document data produced by the PC can be sent to a remote facsimile machine through the facsimile machine serving as the terminal. Also the data sent from the remote facsimile machine can be received and stored in the memory of the PC via the facsimile machine serving as the terminal.

There are other types of facsimile machines that reject reception of the facsimile transmissions in cases of shortage of paper, paper jam, open of a printer cover, a low temperature condition of a thermal fixing heater and the like. Some facsimile machines have a memory reception capability wherein when the facsimile machine is incapable of generating a printed output, the data from the remote facsimile machine is temporarily stored in a memory of the facsimile machine and is later printed based on the data stored in the memory. The facsimile machine with the memory reception capability rejects the reception of the facsimile transmissions when the available memory capacity becomes less than a predetermined minimum. In a facsimile machine of the type wherein on-demand data can be stored in a memory of the facsimile machine, input of the on-demand data is also rejected when the available memory capacity becomes less than the predetermined minimum.

SUMMARY OF THE INVENTION

The present invention has been made to solve the aforementioned problems. Accordingly, it is an object of the present invention to provide a facsimile system including a facsimile machine and a data processing device such as a personal computer mutually connected to each other, wherein various functions of the facsimile machine can be effectively utilized by the support of the data processing device having a large storage capacity. The present invention has been made in view of the fact that the recent personal computer is equipped with an internal memory of a large storage capacity so as to cope with an extended multi-task function.

To achieve the above and other objects, there is provided, according to one aspect of the invention, a facsimile system including a facsimile machine, a data processing device such as a personal computer, detection means, selection means, and control means. The facsimile machine has an input/output interface to which the data processing device is connected. Also, the facsimile machine has a first storage device which may be a RAM. The facsimile machine receives data from a data communicating machine, such as a remote facsimile machine, when a telephone link is established between the facsimile machine and the data communicating device. The data processing device has a second data storage device, such as a hard disk. The detection means detects a residual amount of storage capacity in the first storage device and the second storage device and outputs a first detection signal indicative of the residual amount of storage capacity in the first storage device and a second detection signal indicative of the residual amount of storage capacity in the second storage device. The selection means selects one of the first storage device and the second storage device in response to at least one of the first detection signal and the second detection signal. The control means stores the data in the selected one of the first storage device and the second storage device.

When the first detection signal indicates that the residual amount of storage capacity in the first storage device is less than a predetermined minimum, the selection means selects the second storage device so that the control means stores at least a part of the data in the second storage device.

When the first detection signal first indicates that the residual amount of storage capacity in the first storage device is greater than a predetermined minimum, the selection means selects the first storage device, and thereafter when the first detection signal indicates that the residual amount of storage capacity in the first storage device has become less than the predetermined minimum after storing a part of the data in the first storage device, the selection means selects the second storage device so that the control means stores a remaining part of the data in the second storage device.

When the first detection signal indicates that the residual amount of storage capacity in the first storage device is greater than a predetermined minimum, the selection means selects the first storage device so that the control means stores at least a part of the data in the first storage device.

The facsimile machine may further include a first display for displaying a message informing an operator of non-availability of the first data storage device when the first detection signal indicates that the residual amount of storage capacity in the first storage device has become less than a first predetermined minimum. The data processing device may also further include a second display for displaying a message informing the operator of non-availability of the second storage device when the second detection signal indicates that the residual amount of storage capacity in the second storage device has become less than a second predetermined minimum.

According to another aspect of the present invention, there is provided a facsimile system including a facsimile machine having an input/output interface and a first storage device, and a printing section. The data processing device is connected to the input/output interface of the facsimile machine. The data processing device has a second data storage device. First detection means is provided for detecting a residual amount of storage capacity in the first storage device and the second storage device and outputting a first detection signal indicative of the residual amount of storage capacity in the first storage device and a second detection signal indicative of the residual amount of storage capacity in the second storage device. A second detection means is provided for detecting a status of the printing section and outputting a printer status signal. A selection means is provided for selecting one of the first storage device and the second storage device in response to at least one of the first detection signal and the second detection signal. A control means stores the data in the selected one of the first storage device and the second storage device when the printer status detection signal indicates that the printing section is in an inoperable condition.

When the first detection signal indicates that the residual amount of storage capacity in the first storage device is less than a predetermined minimum, the selection means selects the second storage device so that the control means stores at least a part of the data in the second storage device. When the printer status detection signal indicates that the printing section has been placed in an operable condition after the data is stored in the second storage device, the control means receives the data from the second storage device and controls the printing section to carry out printing based on the data received therefrom. When the first detection signal indicates that the residual amount of storage capacity in the first storage device has become greater than the predetermined minimum after the data is stored in the second storage device, the control means transfers the data stored in the second storage device to the first storage device. The data processing device may further include a printing section and wherein the control means controls the data processing device to carry out printing of the data stored in the second storage device with the printing section of the data processing device. When the data stored in the second storage device is scheduled to be transferred to another data communicating device, the data processing device transfers the data to the another data communicating device when a telephone link is established between the facsimile machine and the another data communicating device.

When the first detection signal first indicates that the residual amount of storage capacity in the first storage device is greater than a predetermined minimum, the selection means selects the first storage device, and thereafter when the first detection signal indicates that the residual amount of storage capacity in the first storage device has become less than the predetermined minimum after storing a part of the data in the first storage device, the selection means selects the second storage device so that the control means stores a remaining part of the data in the second storage device. When the printer status detection signal indicates that the printing section is placed in the operable condition, the control means receives the data from the second storage device and controls the printing section to carry out printing based on the data received therefrom. When the first detection signal indicates that the residual amount of storage capacity in the first storage device has become greater than the predetermined minimum, the control means transfers the data stored in the second storage device to the first storage device.

When the first detection signal indicates that the residual amount of storage capacity in the first storage device is greater than a predetermined minimum, the selection means selects the first storage device so that the control means stores at least a part of the data in the first storage device.

The facsimile machine may further include a first display for displaying a message informing an operator of non-availability of the first data storage device when the first detection signal indicates that the residual amount of storage capacity in the first storage device has become less than a first predetermined minimum. Also, the data processing device may further include a second display for displaying a message informing the operator of non-availability of the second storage device when the second detection signal indicates that the residual amount of storage capacity in the second storage device has become less than a second predetermined minimum.

In response to a call from the data communicating machine, the control means controls the printing section to be a printable condition when the printer status detection signal indicates that the printing section is in the inoperable condition. The printing section has a power consumption saving mode wherein the printing section is placed in the inoperable condition. In response to the call from the data communicating machine, the control means cancels the power consumption saving mode so that the printing section is brought into the printable condition, and after the control means finds that the printing section is in the printable condition, the control means controls the printing section to the data communicating device. The control means controls the printing section to become the power consumption saving mode when the printing section has been in the inoperable condition for more than a predetermined period of time.

When the first detection signal indicates that the residual amount of storage capacity in the first storage device is not sufficient to store an on-demand data that is scheduled to be output to a specified data communicating machine when the specified data communicating machine accesses the facsimile machine, the selection means selects the second storage device so that the control means stores the on-demand data in the second storage device. The control means transfers the on-demand data stored in the second storage device to the first storage device when the first detection signal indicates that the residual amount of storage capacity in the first storage device is recovered to an extent capable of storing the on-demand data. The data processing device transfers the on-demand data stored in the second storage device to the specified data communicating device when the specified data communicating device accesses the facsimile machine.

BRIEF DESCRIPTION OF THE DRAWINGS

The above and other objects, features and advantages of the present invention will become more apparent from the following description when taken in conjunction with the accompanying drawings, in which.

DETAILED DESCRIPTION OF THE PREFERRED EMBODIMENTS

Figure 1:
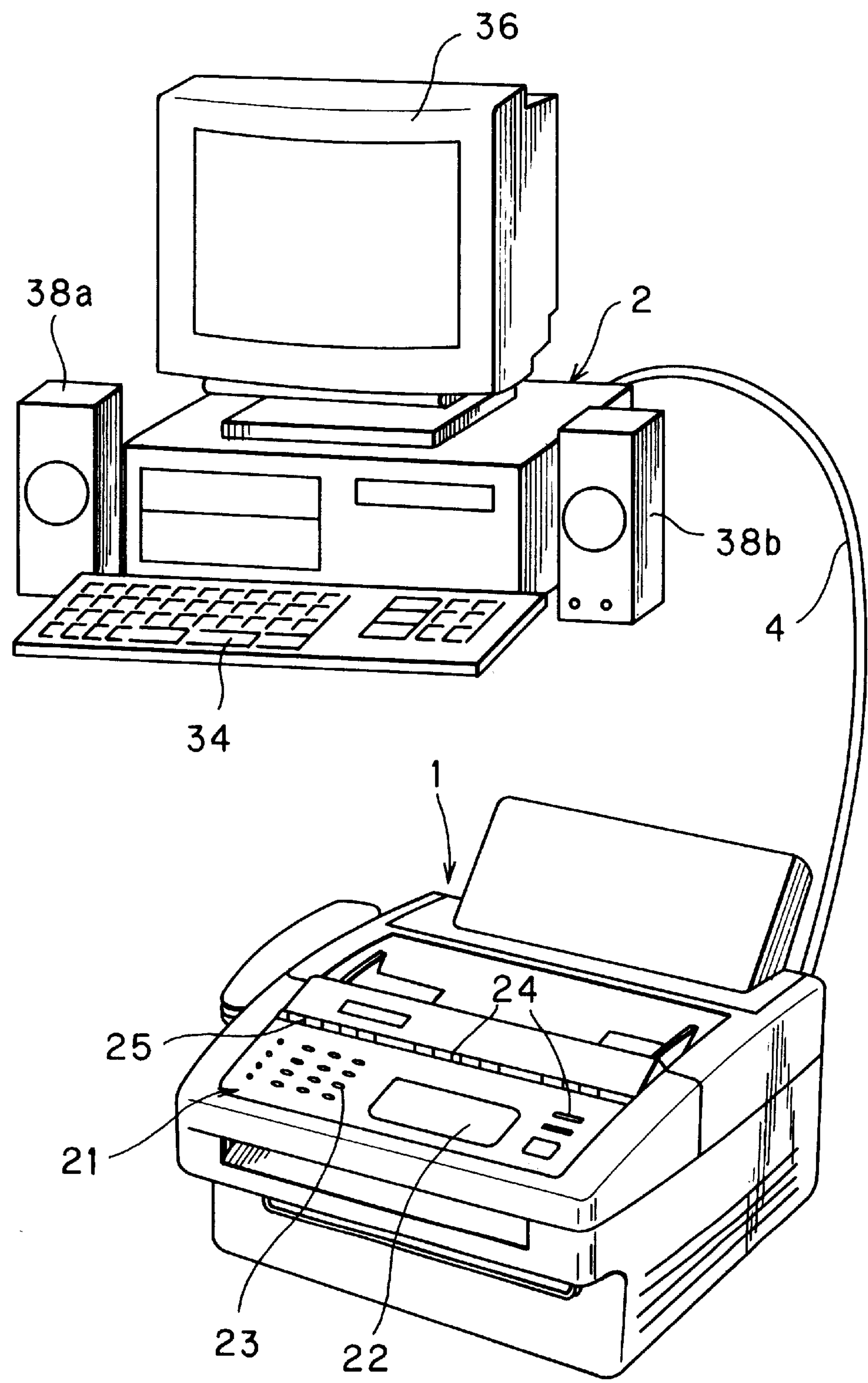
FIG. 1 is a perspective view showing a facsimile machine connected to a personal computer.
Figure 2:
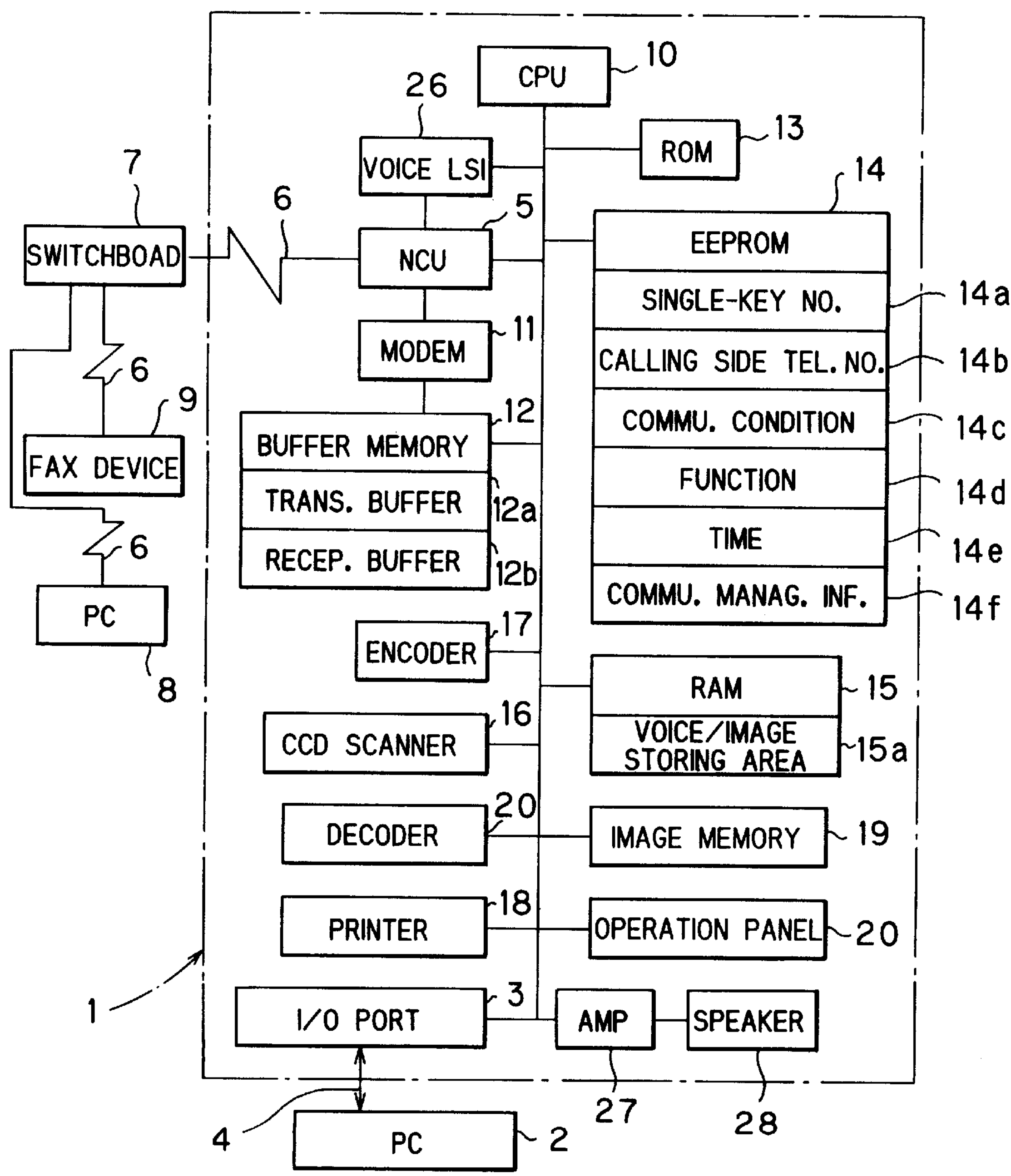
FIG. 2 is a block diagram showing an arrangement of a facsimile machine to which first and second embodiments of the present invention are applied.
Figure 3:
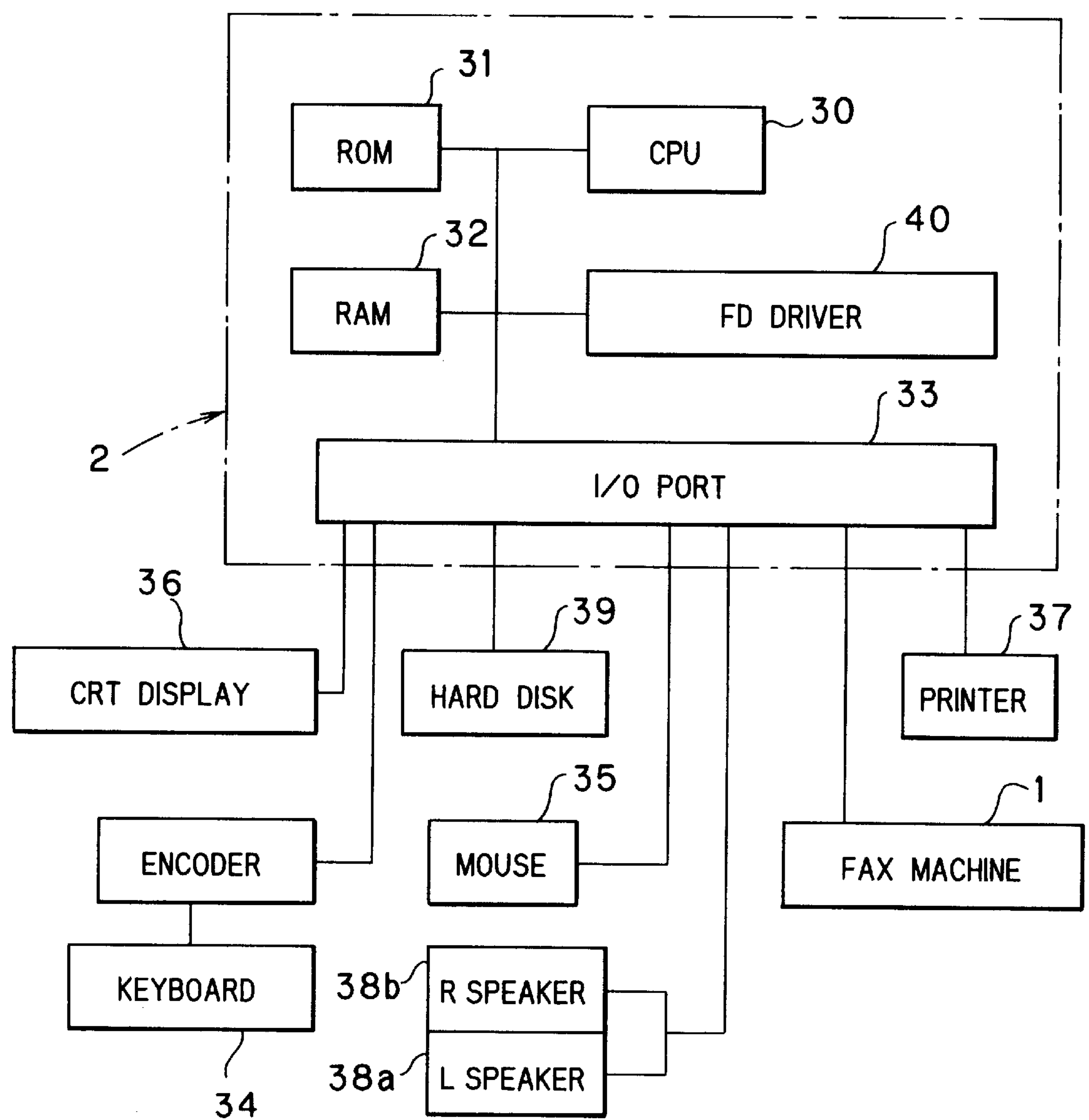
FIG. 3 is a block diagram showing an arrangement of a personal computer.
Figure 4:
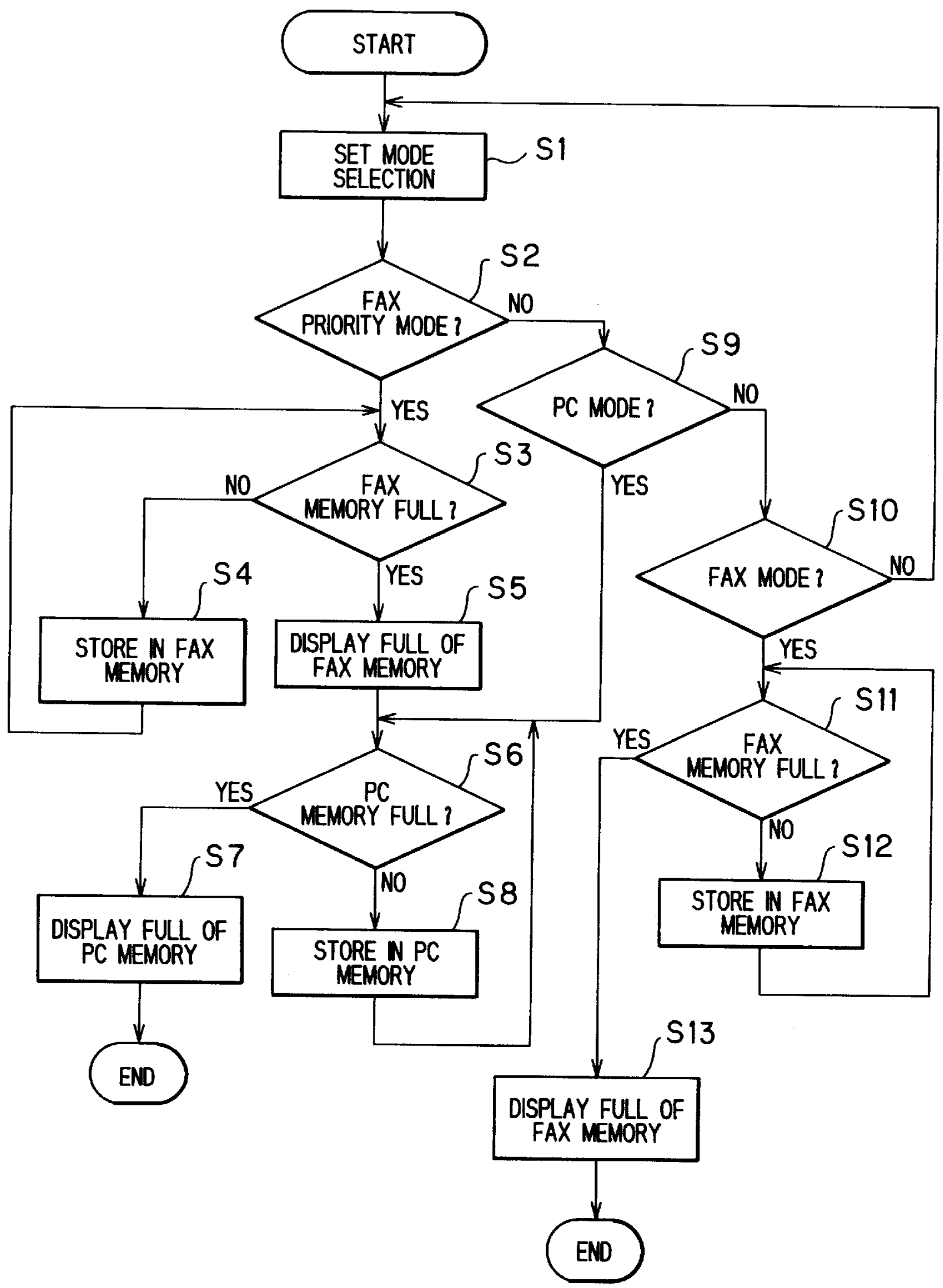
FIG. 4 is a flowchart illustrating a data directing process according to the first embodiment of the present invention.

First and second embodiments of the present invention will be described with reference to FIGS. 1 through 5. FIG. 1 is a perspective view showing a facsimile machine 1 and a personal computer 2 mutually connected with a cable 4. FIG. 2 is a block diagram showing an arrangement of the facsimile machine 1. FIG. 3 is also a block diagram showing an arrangement of the personal computer 2. FIG. 4 is a flowchart illustrating the first embodiment. In the following description relating to the first embodiment, the facsimile machine 1 will be described as a calling side.

As shown in FIG. 2, the facsimile machine 1 has an input/output interface (I/O port) 3 connected to the personal computer 2 with the cable 4. The input/output interface 3 may be a serial interface such as RS-232C, or a parallel interface. The facsimile machine 1 includes a network controller unit (NCU) 5 that is connected through a telephone line 6 to a telephone switchboard 3 to which another facsimile machine 9, which will be described as a receiving side, and another personal computer 8 equipped with a facsimile board modem are connected. The facsimile machine 1 also includes a central processing unit (CPU) 10 which is connected to various components to be described later with signal bus lines. The CPU 10 controls its associated components in accordance with a predetermined communication control sequence and executes data communication, that is, facsimile transmission and reception.

A modem 11 modulates image data in the form of digital signal to an analog signal and transmits the latter signal to a remote facsimile or personal computer through the NCU 5 and the telephone line 6. The modem 11 also demodulates the incoming analog signal received through the telephone line 6 and the NCU 5 to a digital signal. Other than modulation and demodulation, the modem 11 sends to and receives from the remote facsimile machine various kinds of transmission control signals.

As shown in FIG. 2, the CPU 10 is connected through the bus to a buffer memory 12, a read-only memory (ROM) 13 storing control programs therein, an electrically erasable and programmable read-only memory (EEPROM) 14, a random access memory (RAM) 15 temporarily storing various kinds of data, a CCD scanner 16 serving as an image capturing device, an operation panel 21 provided with a liquid crystal display (LCD) 22, a printer 18 serving as a recording device, an encoding section 17, a decoding section 20, and an image memory 19.

The buffer memory 12 has a plurality of storage areas including a transmission buffer memory **12*a* and a reception buffer memory 12*b* for temporarily storing coded image data transmitted to the called side facsimile machine 9 and received from the calling side facsimile machine 9 along with various kinds of data accompanying the coded image data, reception commands, telephone numbers and names of the subscribers of the called side facsimile machines, and the like. The EEPROM 14 has a single-key number storing area 14*a*, a calling side telephone number storing area 14*b*, a communication condition storing area 14*c*, a function storing area 14*d* for storing data and various function programs such as a communication mode program, a time storing area 14*e* for storing incoming and outgoing fax transmission times, and a communication managing information storing area 14*f* for storing communication records. Those storing areas store data regarding dial numbers (telephone numbers) and the names of the subscribers of called side facsimile machines together with single-key numbers for speed dialing, and various kinds of set data for allowing the user to select whether or not the name of the subscriber of the calling side facsimile machine is registered, a fax transaction report is generated, communications report is printed, or to set a calling bell volume, and to set a volume of the speaker equipped with the facsimile machine 1. The EEPROM 14 is a non-volatile memory so that its storing contents are not lost even if the facsimile machine 1** is power down.

The RAM 15 is used to temporarily store various kinds of data at a time of execution of a prescribed operation. The RAM 15 has a voice/image storing area **15*a* for storing voice data and image data received from the remote facsimile machine when the called side facsimile machine 1 is set to an auto-answer mode. The data is stored therein in a digital form. The CCD scanner 16 is for capturing images on an original document and produces image data. The image data is encoded by the encoder 17 and the resultant data is temporarily stored in the buffer memory 12** and then transmitted. A modified READ or MR method is used for a redundancy compression coding. According to such method, the image data is encoded in view of statistic property of run-length, i.e., the duration of white signal or black signal, of the image data.

The printer 18 carries out printing of the received image data on a recording paper by way of an electro-photographic recording method or a thermal printing method. In the electro-photographic recording, a latent image is formed on a photosensitive drum by irradiating a laser beam thereonto in accordance with the image data and the latent image is developed using toner particles. The toner image is transferred onto the recording paper and thermally fixed by a thermal fixing device. In the thermal printing method, the image is printed on a thermal-sensitive paper with a thermal head.

The facsimile machine 1 has a copying capability wherein an original document can be copied using the CCD scanner 16 and the printer 18. Copying can be made in two modes, a multi-copy mode and a sort copy mode. The multi-copy mode makes a desired number of copies for each original document. The sort copy mode sorts the pages of each of plural sets of copies in an order of the pages in the original documents.

The image data received from the remote facsimile machine and dot data for generating print outputs are stored in an image memory 19 which may be a dynamic RAM (DRAM). In a normal fax reception operation in which fax transmission and reception are taken place at a real time, the image data is received after exchanging signals according to a predetermined communication control sequence between the called facsimile machine 1 and the calling facsimile machine 9 or personal computer 8. The image data is temporarily stored in the buffer memory 12 in the form of an analog signal. The image data stored therein is decoded (expanded) by the decoder 20. The resultant data is developed into a dot image and written into the bit image storing area of the image memory 19 so as to print the image on a page basis. The dot image stored in the image memory 19 is developed into bits of a predetermined resolution and the resultant data is sent to the printer 18 for printing on a page basis.

At a time of a memory reception in the facsimile machine, the image data received from the remote facsimile machine is temporarily stored in the image memory 19 upon compressing it. When the received image data is printed, it is developed into the bits of the predetermined resolution and separately stored in the image memory 19. The image data received in the memory reception mode can be transmitted to an external storage device 39 (see FIG. 3) to process the received image data in the personal computer 2. The same is true with respect to the image data stored in the voice/image storing area of the RAM 15 when the facsimile machine is in an auto-answer mode.

When the facsimile transmission is made, the original document to be sent is read by the CCD scanner 16, and the image data output from the CCD scanner 16 is encoded and the resultant data is sent to the remote facsimile machine. When the image data is sent by a memory dialing, the encoded image data is temporarily stored in the image memory 19 and automatically transmitted to the destination shortly thereafter or at a specified time. A scheduled/delayed transmission (timer transmission) is performed when there is a time lag between two places where a communication link is established or when a group transmission is performed wherein the same original document is sent to a plurality of subscribers.

The image data input from the personal computer 2 has already been encoded, so it can be transmitted to the remote facsimile machine after temporarily storing it in the image memory 19. The operation panel 20 provided in the facsimile machine 1 or 9 has a display 22 such as a liquid crystal display for displaying operation conditions of the facsimile machine. The operation panel 20 also has numeral keys 23, function keys 24, and one-touch registration key 25 as shown in FIG. 1. Registration for a memory dialing is performed by entering the telephone number and the name of a called party through depressing the numeral keys 23 and the function keys 24, and then depressing the one-touch registration key 25.

The facsimile machine 1 further includes a voice LSI 26 for storing an answer voice message that is sent out when answering to the incoming call in the auto-answer mode, an amplifier 27 and speaker for reproducing the incoming voice message recorded during the auto-answer mode, and a reproduction key (not shown) for generating an instruction to reproduce the recorded messages.

As shown in FIG. 3, the personal computer 2 includes a central processing unit (CPU) 30, a ROM 31 storing control programs, a RAM 32 for storing various kinds of data, an input/output port (interface) 33 and a floppy disk driver 40. To the personal computer 2 are connected various peripheral components such as a keyboard 34, a mouse 35, a CRT display 36, a printer 37, left and right speakers 38*a* and 38*b*, the facsimile machine 1, the external storage device 39 such as a hard disk.

As will be described later, the facsimile machine 1 and/or the personal computer 2 have a selection means which selects the storage device in which the various kinds of outgoing data and incoming data are stored. The storage devices to be selected by the selection instruction means include the voice/image storing area 15*a* and the image memory 19 both provided in the facsimile machine 1, and the external storage device 39 connected to the personal computer 2. The outgoing data to be stored in such storage devices includes the image data generated by the CCD scanner 16 for the purpose of memory transmission and scheduled/delayed transmission (or timer transmission). The incoming data to be stored in such storage devices includes the image data received from the remote facsimile machine 9 or personal computer when the called facsimile device sets the associated personal computer to receives the incoming data instead, voice data received from a remote telephone set (not shown) when the facsimile machine 1 is in the auto-answer mode, and an electronic mail received from another personal computer 8. A detection means is provided in the facsimile device 1 and/or the personal computer 2 for detecting residual storage capacities of their associated storage devices. The CPU 10 of the facsimile machine 1 serves as a control means having a function to instruct the associated personal computer 2 to store the whole or a part of the incoming data (including image data and voice data) in the storage device of the personal computer 2 when the residual storage capacity in the storage device of the facsimile machine 1 is or has become smaller than a predetermined minimum. Hereinafter, this will be referred to as "data directing function". When executing the data directing function, the data sent to the facsimile machine 1 from the associated computer 2 is excluded from the data to be directed. The liquid crystal display 22 of the facsimile machine 1 and/or the CRT display 36 of the personal computer 2 may display an indication thereon indicating that the storage devices of the facsimile machine and/or the personal computer 2 have become full or the residual storage capacities have become smaller than the predetermined minimum.

Next, the data directing process will be described with reference to the flowchart shown in FIG. 4.

Upon start of the routine, the operator depresses a particular function key provided in the operation panel 21 of the facsimile machine 1 to perform a mode selection to determine a location in which the data is to be stored (S1). The selectable modes include a fax priority mode in which priority is given to the storage device of the facsimile machine 1 (fax memory) in storing the incoming or outgoing data, a PC priority mode in which the incoming data is stored only in the storage device of the personal computer 2 (PC memory), and a fax mode in which the incoming data is stored only in the storage device of the facsimile machine 1.

In S2, determination is made as to whether or not the fax priority mode is selected. If affirmative (S2: Yes), determination is made as to whether or not the storage device of the facsimile machine 1 has a residual storage capacity for storing the data. In other words, whether the memory of the facsimile device 1 is full or not is determined (S3). When the fax memory is not full (S3: No), the data is stored therein (S4). When the fax memory has become full as a result of repetitive processing of S3 and S4 (S3: Yes), an indication of "FAX MEMORY FULL" appears in the LCD 22 of the facsimile machine 1 or the CRT display 36 of the personal computer 2 (S5). Next, the CPU 10 interrogates the personal computer 2 whether the external storage device 39 connected to the personal computer 2 has a residual storage capacity or not. In other words, whether the PC memory is full or not is determined (S6). When the PC memory is full (S6: Yes), an indication of "PC MEMORY FULL" appears in the LCD 22 of the facsimile machine or the CRT display of the personal computer 2, whereupon the routine in S7 ends.

When the PC memory is not full (S6: No), the data is stored in the external storage device 39 (S8). When the PC memory becomes full as a result of repetitive processing of S6 and S8 (S6: Yes), an indication of "PC MEMORY FULL" appears in the LCD 22 of the facsimile machine 1 or the CRT display 36 of the personal computer 2 (S7), whereupon the routine ends. When the fax priority mode has not been set (S2: No), whether or not the PC mode has been set (S9) is determined. When affirmative (S9: Yes), the processing in S6 through S8 are executed. When the residual storage capacity of the PC memory becomes smaller than the predetermined minimum, the routine ends.

When the PC mode has not been set (S9: No), whether or not the fax mode has been set is determined (S10). In the fax mode, the data will be stored only in the fax memory. If the fax mode has been set (S10: Yes), determination is made as to whether or not the fax memory is full (S11). When the fax memory is not full (S11: No), the data will be stored in the fax memory. When the fax memory becomes full as a result of processing of S11 and S12 (S11: Yes), an indication of "FAX MEMORY FULL" appears in the LCD 22 of the facsimile machine 1 or the CRT display 36 of the personal computer 2 (S13), whereupon the routine ends. If the fax mode has not been set (S10: No), the routine returns to S1.

The image data or voice data generated by the CCD scanner 16 or received from the remote facsimile machine or personal computer is directed to and stored in the relevant storage device or memory together with commands attendant to the various functions, such as memory transmission, scheduled/delayed transmission, multi-copy, etc. Voice messages received from the remote telephones when the called facsimile machine is in auto-answering mode are stored in a telephone message storing region. Electronic mails or delivery messages are stored in a mail box or message box. The data stored in these regions can be properly reproduced.

Figure 5:
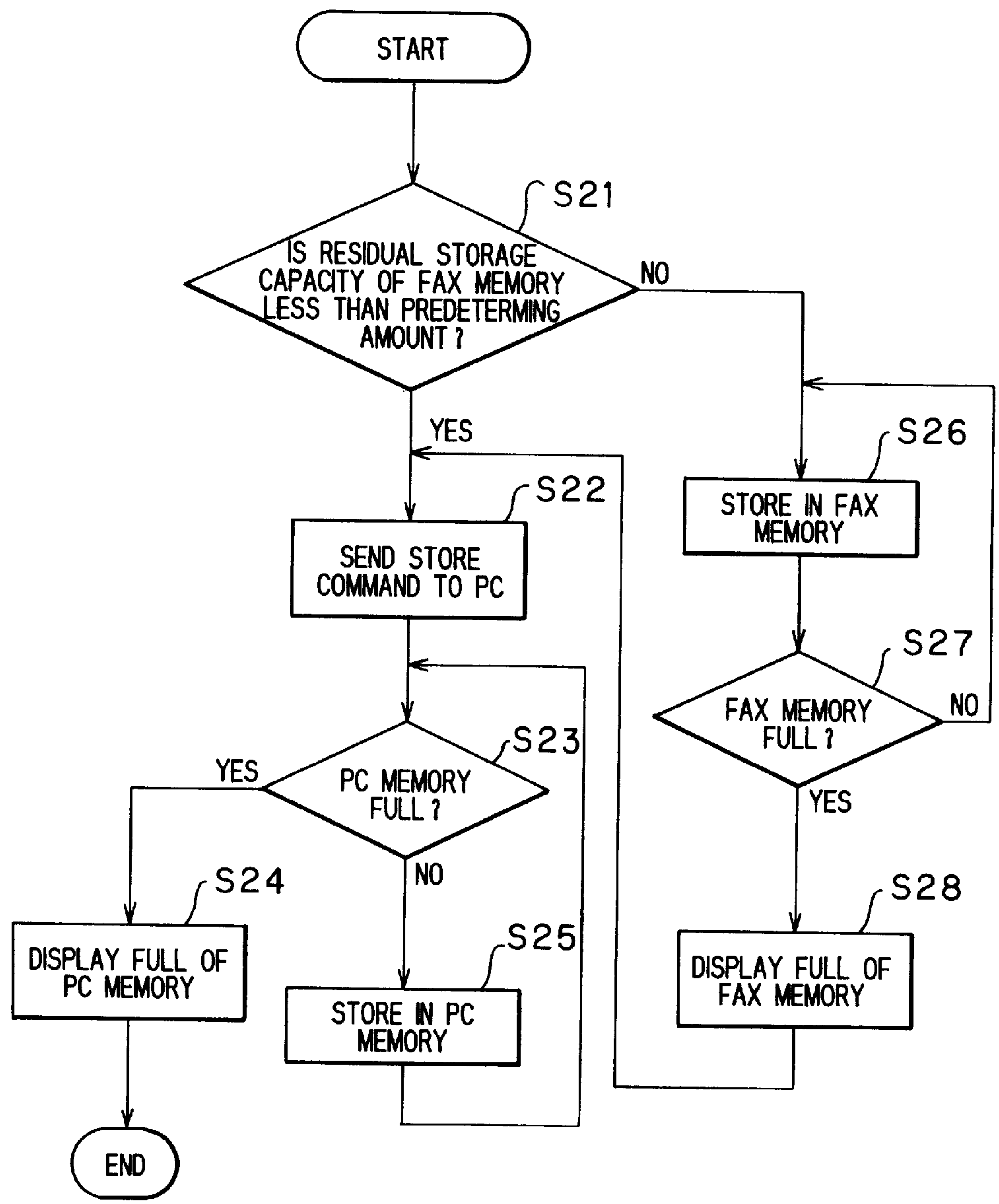
FIG. 5 is a flowchart illustrating a data directing process according to the second embodiment of the present invention.

FIG. 5 shows a second embodiment of the present invention. In this embodiment, when the residual storage capacity in the fax memory has become less than a predetermined minimum, the remaining data which cannot be stored in the fax memory is stored in the PC memory.

Referring to the flowchart of FIG. 5, upon start of the routine, determination is firstly made as to whether or not the residual storage capacity of the fax memory is less than the predetermined minimum (S21). When the residual storage capacity is less than the predetermined minimum (S21: Yes), a store command is sent out to the personal computer 2 (S22). Then, whether or not the external storage device 39 of the personal computer 2 has a residual storage capacity is interrogated. In other words, whether or not the PC memory is full is determined (S23). When the PC memory is full (S23: Yes), an indication of "PC MEMORY FULL" appears in the LCD 22 of the facsimile machine 1 or the CRT display 36 of the personal computer 2 (S24), whereupon the routine ends. When the PC memory is not full (S23: No), the data is stored in the external storage device 39 of the personal computer 2 (S25). When the PC memory has become full as a result of repetitive processing of S23 and S25 (S23: Yes), the indication of "PC MEMORY FULL" appears in the display (S24), whereupon the routine ends.

When the residual storage capacity of the fax memory is not less than the predetermined minimum (S21: No), the data is stored in the fax memory (S26). Then, whether or not the fax memory has become full is determined (S27). When the fax memory has not yet become full (S27: No), the data is stored in the fax memory (S26). When the fax memory has become full (S27: Yes), the indication of "FAX MEMORY FULL" appears in the LCD 22 of the facsimile machine 1 or the CRT display 36 of the personal computer 2 (S28), whereupon the routine proceeds to S22 where the store command is sent to the personal computer 2. In response to the store command, the personal computer 2 stores the data in the PC memory. Through the above processing, the data is separately stored in different locations. However, data will not be lost or missed even when a large amount of data is received.

Figure 6:
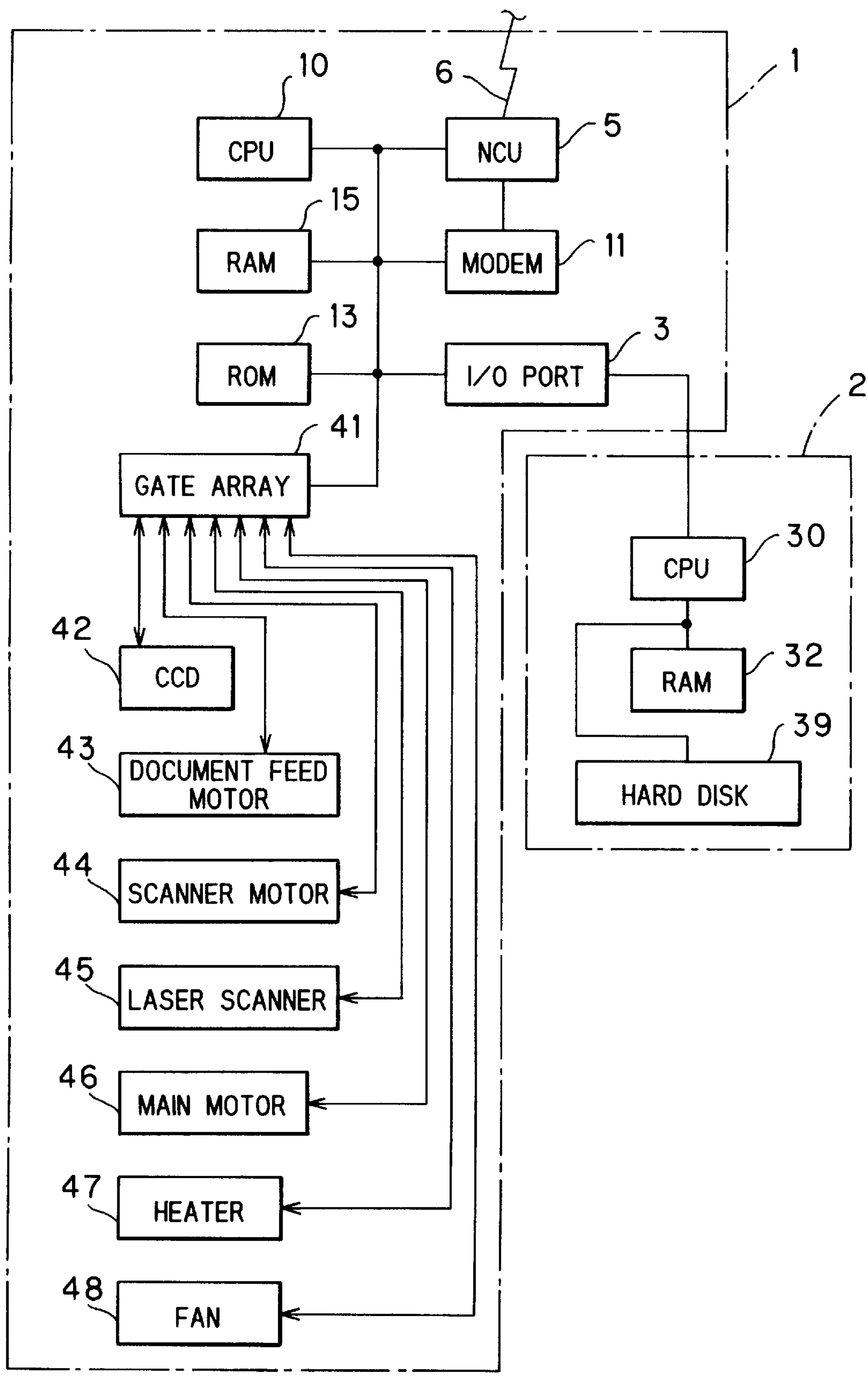
FIG. 6 is a block diagram showing arrangements of a facsimile machine and a personal computer to which a third embodiment of the present invention is applied.
Figure 7:
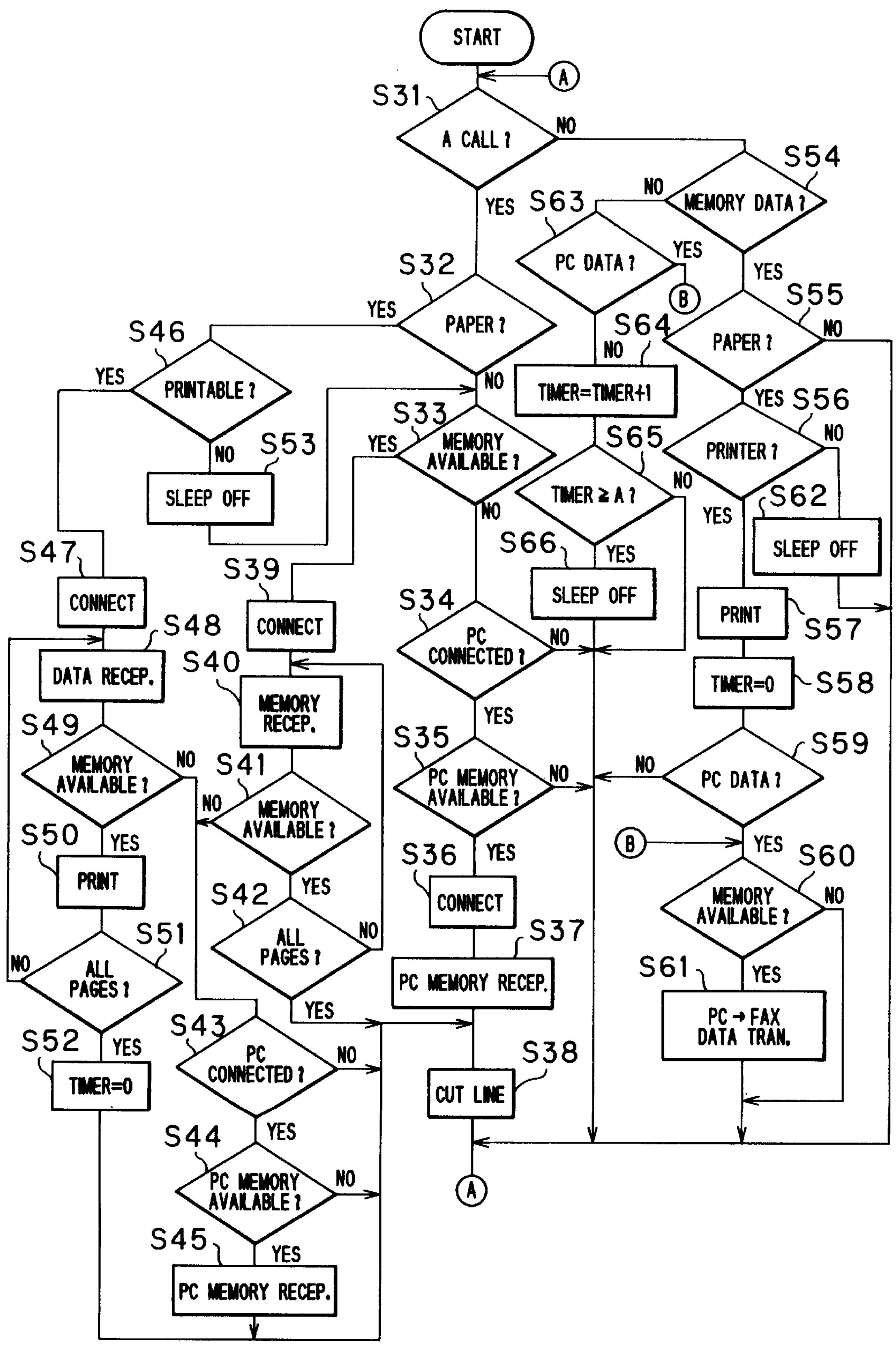
FIG. 7 is a flowchart illustrating a data directing process according to the third embodiment of the present invention.

Referring next to FIGS. 6 and 7, the third embodiment of the present invention will be described wherein the same reference numerals will be used to denote the same components as those appear in FIGS. 1 through 3. Duplicate description of such components will not be repeated herein.

FIG. 6 is a block diagram showing a facsimile machine used in the second embodiment. The facsimile machine 1 incorporates a laser printing section for generating a facsimile output. The facsimile machine 1 includes a gate array 41 in addition to a CPU 10, a ROM 13, a RAM 15, an NCU 5, a modem 11, and an I/F port for connection to a personal computer 2. Those components are mutually connected with bus lines. To the gate array 41 are connected a CCD 8, a document feed motor 43, a scanner 44, a laser scanner 45, a main motor 46, a heater 47 and a fan 48. The CCD 42 reads the original document while feeding an original document at every predetermined pitch by the document feed motor 43. The scanner motor 44 drives the laser scanner 45 which scans a laser beam for recordation. The main motor 12 is provided mainly for a paper transportation and a toner agitation. The heater 47 is used for thermally fixing a toner image. The fan 48 is provided for expelling heat generated from the heater 47. The scanner motor 44, the laser scanner 45, the main motor 46, the heater 47 and the fan 14 are the components of the laser printing section.

A facsimile reception sequence will be described while referring to the flowchart shown in FIG. 7.

In the reception process, the CPU 10 monitors the NCU 5 and determines whether or not a call from a remote facsimile machine is received (S31). When there is a call from the remote facsimile machine (S31: Yes), the CPU 10 determines whether or not recording papers are present in the laser printing section (S32). This determination is made based on the detection signal output from a paper sensor (not shown) that senses the presence of the recording papers. If the recording papers are not present (S32: No), printing of the received image data cannot be accomplished, so the CPU 10 checks if there is an available storage capacity in the RAM 15 (S33) to perform a memory reception. The judgment as to whether or not there remains a sufficient amount of storage capacity in the RAM 15 is made based on whether or not one page worth of data of the documents with an average density can be stored therein. If there is a space to store one page worth of data in the RAM 15, an affirmative determination will be made in S33. If there is no available storage capacity therein (S33: No), the memory reception cannot be accomplished, so the CPU 10 checks if the personal computer 2 is connected to the I/O port 3 (S34). If the personal computer 2 is connected thereto (S34: Yes), the CPU 10 next checks whether or not the hard disk 39 has an available storage area (S35). If the available storage area exists therein (S35: Yes), the CPU 10 controls the NCU 5 to receive the incoming image data in the hard disk 39 of the personal computer 2 (S36).

The status of the hard disk 39 is checked based on a reply command issued from the CPU 30 of the personal computer 2 responsive to an interrogation command issued to the CPU 30 from the CPU 10 of the facsimile machine 1. The CPU 10 also issues a data reception request to the CPU 30 of the personal computer 2 requesting to receive the data in the hard disk 39, whereupon the reception data demodulated by the modem 11 is output to the personal computer 2. The CPU 30 of the personal computer 2 stores the reception data relayed from the facsimile machine 1 in the hard disk 39 (S37). In this manner, the reception data is received at the personal computer 2. When the reception data is entirely stored in the hard disk 39, the CPU 10 controls the NCU 5 so that the line is disconnected (S38), whereupon the routine returns to S31. Also, in S35, if there is no available storage area in the hard disk 39 (S35: No), the routine returns to S31. Similarly, in S34, if the personal computer 2 is not connected to the I/O port 3, the routine returns to S31.

When the received image data can be neither printed nor stored in the fax memory or the PC memory, the routine circulates a loop defined by S31 through S35, resulting in that the incoming data cannot be received. However, when a condition in which the incoming data cannot be received continues for more than a predetermined period of time, the calling activity in the calling side will be terminated so that the loop circulation will also be stopped.

In S33, when there exists an available storage area in the RAM 15 (S33: Yes), the CPU 10 controls the NCU 5 to receive the data (S39) and stores the reception data demodulated by the modem 11 in the RAM 15 (S40). Then, the CPU 10 determines whether or not there still exists an available storage area in the RAM 15 (S41). If there is an available storage area therein (S41: Yes), then the CPU 10 determines whether or not the memory reception is complete (S42). If the memory reception is complete (S42: Yes), the routine proceeds to S38 where the line is disconnected. In this manner, the memory reception is carried out.

In S42, if the memory reception has not yet finished (S42: No), the routine returns to S40 where the memory reception is continuously carried out. In S41, if there is no available memory area in the RAM 15 (S41: No), the CPU 10 determines whether or not the personal computer 2 is connected to the I/O port 3 (S43). If the personal computer 2 is connected thereto (S43: Yes), determination is made as to whether or not an available storage area remains in the hard disk 39 of the personal computer 2 (S44). If the hard disk 39 is available (S44: Yes), the reception data is stored in the hard disk 39 of the personal computer 2 (S45), whereupon the routine proceeds to S38 where the line is disconnected. As described, when the RAM 13 becomes unavailable during the memory reception therein, the associated personal computer will receive the incoming data.

In S44, if the hard disk 39 is not available (S44: No), the routine proceeds to S38 where the line is disconnected. In S43, if the personal computer 2 is not connected to the I/O port 3 (S43: No), the routine also proceeds to S38 where the line is disconnected.

In S32, if the recording papers are present in the laser printing section (S32: Yes), it might be possible to print the reception data and so the CPU 10 investigates the temperature of the heater 47 and determines whether or not the temperature thereof is as high as to perform printing (S46). This determination is made based on the detection signal output from a temperature sensor (not shown) that is disposed in the vicinity of the heater 47. When the heater 47 has been heated up to a level sufficient to perform printing (S46: Yes), the CPU 10 controls the NCU 5 to establish the communication link with the calling facsimile machine (S47) and to receive the data therefrom (S48). Then, the CPU 10 checks whether or not there exists an available storage area in the RAM 15 (S49). If there exists a space to store the data in the RAM 15 (S49: Yes), the CPU 10 decodes the data and carries out printing while controlling the scanner motor 44, the laser scanner 45 and the main motor 46 (S50). The CPU 10 then determines whether or not printing of all the pages is complete (S51). If all the pages are printed (S51: Yes), the CPU 10 clears a timer (not shown), that is implemented by a counter, in order to determine whether or not the facsimile machine 1 is placed in a sleep mode (S52), whereupon the routine proceeds to S38 where the line is disconnected.

In S49, when there is no available storage area in the RAM 15 (S49: No), then the routine proceeds to S33 where the CPU 10 interrogates whether or not the personal computer 2 receives the data in place of the facsimile machine 1. That is, even if the residual storage capacity of the RAM 15 becomes smaller than the predetermined minimum, the remaining data can be stored in the PC memory if possible.

In S46, if the heater 47 is not heated up (S46: No), the laser printing section is in the sleep mode wherein the heater 47 and the fan 48 are switched off to reduce the power consumption. Therefore, the CPU 10 turns the heater 47 and the fan 48 on to thereby cancels the sleep mode (S53), whereupon the routine proceeds to S33 where the CPU 10 determines whether or not the RAM 15 has an available storage area. Specifically, until the heater 47 is heated up to a temperature capable of printing, the memory reception or PC reception is carried out if possible.

The reception data which has been stored in the RAM 15 or the hard disk 39 of the personal computer 2, if any, has to be printed during the non-busy time of the facsimile machine 1. Therefore, when there is no call from the remote facsimile machines (S31: No), the CPU 10 checks whether or not the RAM 15 stores the reception data (S54). The fact that the RAM 15 stores the reception data (S54: Yes) means that the memory reception has been done. Therefore, the CPU 10 checks whether or not the recording papers are present in the laser printing section (S55). If the recording papers are present (S55: Yes), then the CPU 1 checks the temperature of the heater 47 to determine if the printing can be carried out (S26). If the heater 47 is at a temperature capable of printing (S56: Yes), the reception data stored in the RAM 15 is printed while controlling the scanner motor 44, the laser scanner 45 and the main motor 46 (S57), whereupon the timer is cleared (S58).

Next, the CPU 10 determines that the reception data is stored in the hard disk 39 of the personal computer 2 (S59). This determination is made based on the reply command from the CPU 30 of the personal computer 2, which is issued responsive to the interrogation command sent from the CPU 10 of the facsimile machine 1 to the CPU 30 of the personal computer. The fact that the reception data is stored in the hard disk 39 (S59: Yes) means that the PC memory reception has been done. The CPU 10 then checks if the RAM 15 has an available storage area (S60). If there is a space to store data in the RAM 15 (S60: Yes), the reception data stored in the hard disk 39 of the personal computer 2 is transferred to the RAM 15 (S61), whereupon the routine returns to S31. This data transfer is done by issuing a transfer request command to the personal computer 2 from the CPU 10, reading the reception data from the hard disk 30 by the CPU 30 of the personal computer 2, and storing the reception data thus read in the RAM 15 by the CPU 10. When the routine returns to S31 after transferring the reception data to the RAM 15, the processing in S24 and on is executed, whereby printing of the reception data transferred to the RAM15 is accomplished.

If in S50 the residual storage capacity in the RAM 15 is not as large as to store the reception data (S60: No), the reception data retained by the personal computer 2 cannot be transferred to the RAM 15. Therefore, the routine returns to S31. In S59, if the reception data is not retained in the hard disk 39 of the personal computer 2, then the routine returns to S31. The fact that the temperature of the heater 47 is not as high as to perform printing (S56: No) indicates that the laser printing section is in the sleep mode to reduce the power consumption, in which the heater 47 and the fan 48 are switched off. The CPU 10 turns the heater 47 and the fan 48 on to cancel the sleep mode (S62), whereupon the routine returns to S31. Specifically, when the printing section is not ready for printing, the routine returns to S31 to check if there is any call from another facsimile machine using a duration of time in which the heater 47 is heated up to a temperature capable of printing. In S25, if there is no recording papers in the printing section (S55: No), the routine returns to S31.

The fact that there is no reception data in the RAM 15 (S54: No) indicates that the memory reception in the facsimile machine 1 has not been performed or the printing of the data which has been stored in the RAM 15 has finished. Then, the CPU 10 determines if the reception data is stored in the hard disk 39 of the personal computer 2 (S63). If the reception data is stored therein (S63: Yes), the routine proceeds to S60 where a process to transfer the reception data is executed. The fact that the reception data is not stored in the hard disk 39 (S63: No) indicates that the reception data to be printed is not present. Therefore, the CPU 10 counts up the timer by one (S64) and determines whether or not the count value of the timer is greater than a predetermined number A (S65). If affirmative (S65: Yes), the heater 47 and the fan 48 are turned off to put the printing section in the sleep mode (S66), whereupon the routine returns to S31. If the count value of the timer is not greater than the predetermined number A (S65: No), the routine returns to S31. Specifically, the timer is cleared whenever printing is carried out (S52, S58) and is counted up each time the process in S64 is executed. Consequently, the count number indicates a time running from the end of previous print. When the time has reached the predetermined value, the printing section is put in the sleep mode to reduce the power consumption.

As described, when the reception data cannot be printed in the facsimile machine 1 (S32: No, S46: No) and the reception data cannot be stored in the RAM 15 (S33: No), the reception data is sent to the personal computer 2 to store the same in the hard disk 39 (S37). Accordingly, reception of the incoming data is ensured even if printing cannot be carried out immediately and the RAM 15 is not available in storing the reception data due to shortage of the storage capacity. Because the capacity of the hard disk 39 is generally very large, it is assumed that the reception data can be stored in the hard disk 39 for the most cases. Besides the data stored in the hard disk 39 is not lost even if the personal computer 2 is power down, so the hard disk 39 can be relied upon in storing the data received from the remote facsimile machine. The hard disk 39 is available in storing the reception data even in a situation where the storage capacity of the RAM 15 becomes insufficient during printing and reception of the data (S45).

When the printing section is placed in a condition ready for printing or the RAM 15 is brought to a condition capable of storing the reception data (S56: Yes, S60: Yes), the data stored in the hard disk 39 is printed or transferred to the RAM 15 (S57, S61). By so doing, the storage area of the hard disk 39 where the reception data has been occupied becomes available for other purposes, and thus the load imposed on the hard disk is minimized. As soon as the printing section is placed in a condition capable of printing, the reception data stored in the RAM 15 is sent out to the printing section for printing. Therefore, even if the reception data are received at the memories in the facsimile machine or the personal computer, printing of the reception data is not so delayed.

When the sleep mode of the printing section prevents printing of the reception data, the heater 47 and the fan 48 are turned on in response to a call from another facsimile machine (S53). After the heater 47 is heated up (S56: Yes), the reception data is received from the personal computer and printed (S57). As such, the reception data can be received even if the printing section is in the sleep mode. In addition, printing of the reception data is performed at the earliest convenience.

When the personal computer 2 plays a role of a receiving end, the data may be stored in the RAM 32 in lieu of the hard disk 39. Also, the data stored in the personal computer 2 may be printed out using a computer-equipped printer upon decoding the reception data stored in the hard disk 39 with the CPU 30 and RAM 32 of the personal printer 2. Printing of the reception data can be continued with the computer-equipped printer until the printing section of the facsimile machine is placed in a printable condition.

Some facsimile machines are provided with a fax-forward function in which the reception data can be transferred to another facsimile machine. To use the fax-forward function, the RAM of the facsimile machine is utilized. The fax-forward function can be utilized in the present invention even if the storage capacity of the RAM is not sufficient in implementing the fax-forward function. To do this, the reception data is transferred to the personal computer 2 to store it in the hard disk 39. When the communication line is established between the facsimile machine 1 and the remote facsimile machine, the personal computer 2 transfers the data to the remote facsimile machine.

The present invention can also be applied to such facsimile machines that are provided with a fax-on-demand or a voice-on-demand function in which a message to a particular caller can be stored. Specifically, if the RAM 15 does not have a sufficient storage capacity to store on-demand data input by the user, the data is transferred to the personal computer 2 and stored in its hard disk 39. When the RAM 5 of the facsimile machine 1 becomes available in storing the on-demand data, the data stored in the hard disk 39 is transferred to the RAM 15. If there is an access to the on-demand data from another facsimile machine before the on-demand data is transferred to the RAM 15, the called facsimile machine will send out the on-demand data to the calling facsimile machine upon receiving the data from the personal computer 2.

A sleep function can be awarded to such facsimile machines that are not provided with a sleep function by the associated personal computer. Specifically, the personal computer 2 sends a command to the facsimile machine to turn off the heater 47 and the fan 48 when the printing section in the facsimile machine is not operating for more than a predetermined period of time, thereby placing the printing section in the sleep mode. In response to a call from another facsimile machine, the personal computer 2 sends a command to the facsimile machine 1 to turn on the heater 47 and the fan 48. After the heater 47 becomes available, the facsimile machine 1 receives the reception data from the personal computer 2 and initiates printing. By so doing, the power consumption can be reduced.

Further modifications can be made by replacing the personal computer with other types of computers including a work station.

While some exemplary embodiments of this invention have been described in detail, those skilled in the art will recognize that there are many possible modifications and variations which may be made in these exemplary embodiments while yet retaining many of the novel features and advantages of the invention.

We claim:

1. A facsimile system comprising:

a facsimile machine having an input/output interface and a first storage device, said facsimile machine receiving data from a data communicating machine when a telephone link is established between said facsimile machine and said data communicating device;

a data processing device connected to said input/output interface of said facsimile machine, said data processing device having a second data storage device;

detection means for detecting a residual amount of storage capacity in said first storage device and said second storage device and outputting a first detection signal indicative of the residual amount of storage capacity in said first storage device and a second detection signal indicative of the residual amount of storage capacity in said second storage device;

selection means for selecting one of said first storage device and said second storage device in response to at least one of the first detection signal and the second detection signal; and control means for storing the data in the selected one of said first storage device and said second storage device;

wherein when said first detection signal first indicates that the residual amount of storage capacity in said first storage device is greater than a predetermined minimum, said selection means selects said first storage device, and thereafter when said first detection signal indicates that the residual amount of storage capacity in said first storage device has become less than the predetermined minimum after storing a part of the data in said first storage device, said selection means selects said second storage device so that said control means stores a remaining part of the data in said second storage device.

2. The facsimile system according to claim 1, wherein when said first detection signal indicates that the residual amount of storage capacity in said first storage device is less than a predetermined minimum, said selection means selects said second storage device so that said control means stores at least a part of the data in said second storage device.

3. The facsimile system according to claim 1, wherein when said first detection signal first indicates that the residual amount of storage capacity in said first storage device is greater than a predetermined minimum, said selection means selects said first storage device, and thereafter when said first detection signal indicates that the residual amount of storage capacity in said first storage device has become less than the predetermined minimum after storing a part of the data in said first storage device, said selection means selects said second storage device so that said control means stores a remaining part of the data in said second storage device.

4. The facsimile system according to claim 1, wherein when said first detection signal indicates that the residual amount of storage capacity in said first storage device is greater than a predetermined minimum, said selection means selects said first storage device so that said control means stores at least a part of the data in said first storage device.

5. The facsimile system according to claim 1, wherein said facsimile machine further includes a first display for displaying a message informing an operator of non-availability of said first data storage device when said first detection signal indicates that the residual amount of storage capacity in said first storage device has become less than a first predetermined minimum, and wherein said data processing device further includes a second display for displaying a message informing the operator of non-availability of said second storage device when said second detection signal indicates that the residual amount of storage capacity in said second storage device has become less than a second predetermined minimum.

6. A facsimile system comprising:

a facsimile machine having an input/output interface and a first storage device, and a printing section, said facsimile machine receiving data from a data communicating machine when a telephone link is established between said facsimile machine and said data communicating device;

a data processing device connected to said input/output interface of said facsimile machine, said data processing device having a second data storage device;

first detection means for detecting a residual amount of storage capacity in said first storage device and said second storage device and outputting a first detection signal indicative of the residual amount of storage capacity in said first storage device and a second detection signal indicative of the residual amount of storage capacity in said second storage device;

second detection means for detecting a status of said printing section and outputting a printer status signal;

selection means for selecting one of said first storage device and said second storage device in response to at least one of the first detection signal and the second detection signal; and control means for storing the data in the selected one of said first storage device and said second storage device when the printer status detection signal indicates that said printing section is in an inoperable condition.

7. The facsimile system according to claim 6, wherein when said first detection signal indicates that the residual amount of storage capacity in said first storage device is less than a predetermined minimum, said selection means selects said second storage device so that said control means stores at least a part of the data in said second storage device.

8. The facsimile system according to claim 7, wherein when the printer status detection signal indicates that said printing section has been placed in an operable condition after the data is stored in said second storage device, said control means receives the data from said second storage device and controls said printing section to carry out printing based on the data received therefrom.

9. The facsimile system according to claim 7, wherein when said first detection signal indicates that the residual amount of storage capacity in said first storage device has become greater than the predetermined minimum after the data is stored in said second storage device, said control means transfers the data stored in said second storage device to said first storage device.

10. The facsimile system according to claim 7, wherein said data processing device further includes a printing section and wherein said control means controls said data processing device to carry out printing of the data stored in said second storage device with said printing section of said data processing device.

11. The facsimile system according to claim 7, wherein when the data stored in said second storage device is scheduled to be transferred to another data communicating device, said data processing device transfers the data to said another data communicating device when a telephone link is established between said facsimile machine and said another data communicating device.

12. The facsimile system according to claim 6, wherein when said first detection signal first indicates that the residual amount of storage capacity in said first storage device is greater than a predetermined minimum, said selection means selects said first storage device, and thereafter when said first detection signal indicates that the residual amount of storage capacity in said first storage device has become less than the predetermined minimum after storing a part of the data in said first storage device, said selection means selects said second storage device so that said control means stores a remaining part of the data in said second storage device.

13. The facsimile system according to claim 12, wherein when the printer status detection signal indicates that said printing section is placed in the operable condition, said control means receives the data from said second storage device and controls said printing section to carry out printing based on the data received therefrom.

14. The facsimile system according to claim 12, wherein when said first detection signal indicates that the residual amount of storage capacity in said first storage device has become greater than the predetermined minimum, said control means transfers the data stored in said second storage device to said first storage device.

15. The facsimile system according to claim 6, wherein when said first detection signal indicates that the residual amount of storage capacity in said first storage device is greater than a predetermined minimum, said selection means selects said first storage device so that said control means stores at least a part of the data in said first storage device.

16. The facsimile system according to claim 6, wherein said facsimile machine further includes a first display for displaying a message informing an operator of non-availability of said first data storage device when said first detection signal indicates that the residual amount of storage capacity in said first storage device has become less than a first predetermined minimum, and wherein said data processing device further includes a second display for displaying a message informing the operator of non-availability of said second storage device when said second detection signal indicates that the residual amount of storage capacity in said second storage device has become less than a second predetermined minimum.

17. The facsimile system according to claim 6, wherein in response to a call from said data communicating machine, said control means controls said printing section to be a printable condition when said printer status detection signal indicates that said printing section is in the inoperable condition.

18. The facsimile system according to claim 17, wherein said printing section has a power consumption saving mode wherein said printing section is placed in the inoperable condition, and wherein in response to the call from said data communicating machine, said control means cancels the power consumption saving mode so that said printing section is brought into the printable condition, and after said control means finds that said printing section is in the printable condition, said control means controls said printing section toothier data communicating device.

19. The facsimile system according to claim 17, wherein said control means controls said printing section to become the power consumption saving mode when said printing section has been in the inoperable condition for more than a predetermined period of time.

20. The facsimile system according to claim 6, wherein when the first detection signal indicates that the residual amount of storage capacity in said first storage device is not sufficient to store an on-demand data that is scheduled to be output to a specified data communicating machine when said specified data communicating machine accesses said facsimile machine, said selection means selects said second storage device so that said control means stores the on-demand data in the second storage device, wherein said control means transfers the on-demand data stored in said second storage device to said first storage device when the first detection signal indicates that the residual amount of storage capacity in said first storage device is recovered to an extent capable of storing the on-demand data, and wherein said data processing device transfers the on-demand data stored in said second storage device to said specified data communicating device when said specified data communicating device accesses said facsimile machine.

21. A facsimile machine for use with a data processing device that includes a second data storage device, the facsimile machine receiving data from a data communicating machine when a telephone link is established between the facsimile machine and the data communicating device, the facsimile machine including:

a first storage device;

an input/output interface connected to the data processing device;

detection means for detecting a residual amount of storage capacity in said first storage device and said second storage device and outputting a first detection signal indicative of the residual amount of storage capacity in said first storage device and a second detection signal indicative of the residual amount of storage capacity in said second storage device;

selection means for selecting one of said first storage device and said second storage device in response to at least one of the first detection signal and the second detection signal; and control means for storing the data in the selected one of said first storage device and said second storage device;

wherein when said first detection signal first indicates that the residual amount of storage capacity in said first storage device is greater than a predetermined minimum, said selection means selects said first storage device, and thereafter when said first detection signal indicates that the residual amount of storage capacity in said first storage device has become less than the predetermined minimum after storing a part of the data in said first storage device, said selection means selects said second storage device so that said control means stores a remaining part of the data in said second storage device.

22. The facsimile machine according to claim 21, wherein when said first detection signal indicates that the residual amount of storage capacity in said first storage device is less than a predetermined minimum, said selection means selects said second storage device so that said control means stores at least a part of the data in said second storage device.

23. The facsimile machine according to claim 21, wherein when said first detection signal first indicates that the residual amount of storage capacity in said first storage device is greater than a predetermined minimum, said selection means selects said first storage device, and thereafter when said first detection signal indicates that the residual amount of storage capacity in said first storage device has become less than the predetermined minimum after storing a part of the data in said first storage device, said selection means selects said second storage device so that said control means stores a remaining part of the data in said second storage device.

24. The facsimile machine according to claim 21, wherein when said first detection signal indicates that the residual amount of storage capacity in said first storage device is greater than a predetermined minimum, said selection means selects said first storage device so that said control means stores at least a part of the data in said first storage device.

25. The facsimile machine according to claim 21, wherein said facsimile machine further includes a first display for displaying a message informing an operator of non-availability of said first data storage device when said first detection signal indicates that the residual amount of storage capacity in said first storage device has become less than a first predetermined minimum, and wherein said data processing device further includes a second display for displaying a message informing the operator of non-availability of said second storage device when said second detection signal indicates that the residual amount of storage capacity in said second storage device has become less than a second predetermined minimum.

* * * * *